May 29, 1928.

J. G. NORTON

MEASURING APPARATUS

Filed Feb. 21, 1922

Inventor:
James G. Norton

May 29, 1928.
J. G. NORTON
1,671,737
MEASURING APPARATUS
Filed Feb. 21. 1922
3 Sheets-Sheet 2
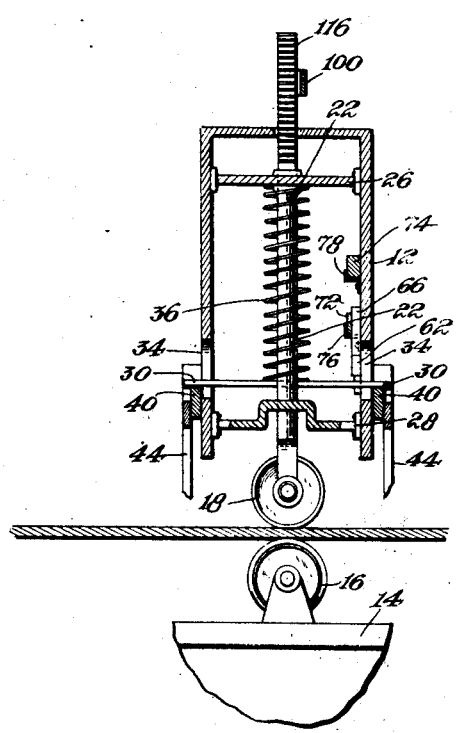
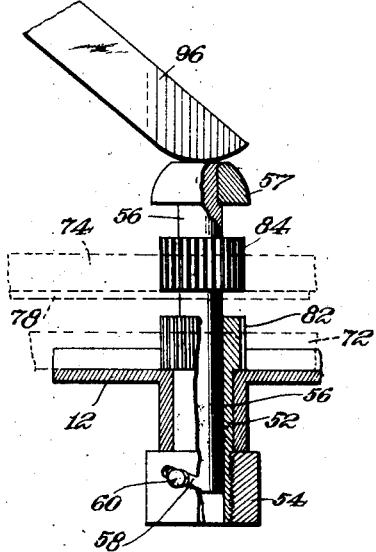
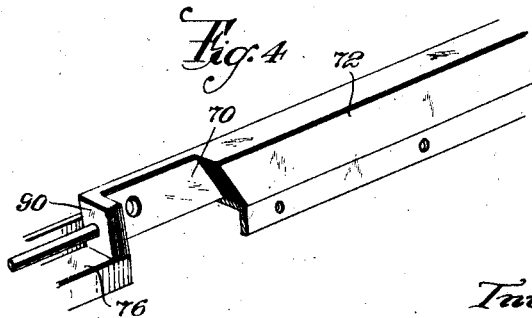
Inventor
James G. Norton May 29, 1928.
J. G. NORTON
MEASURING APPARATUS
Filed Feb. 21, 1922
1,671,737
3 Sheets-Sheet 3
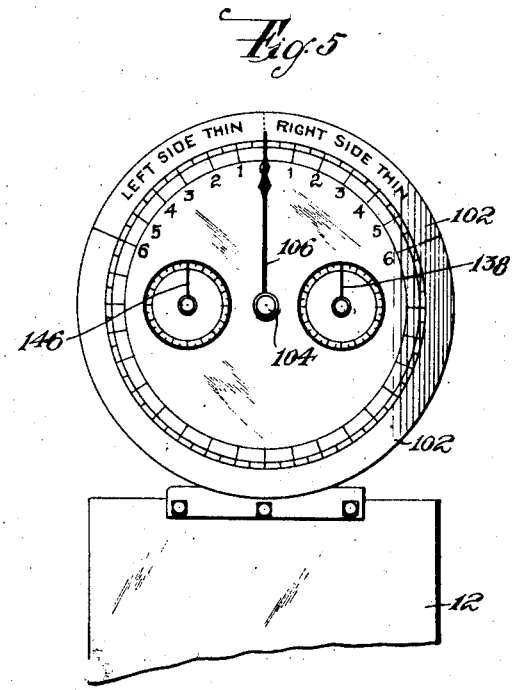
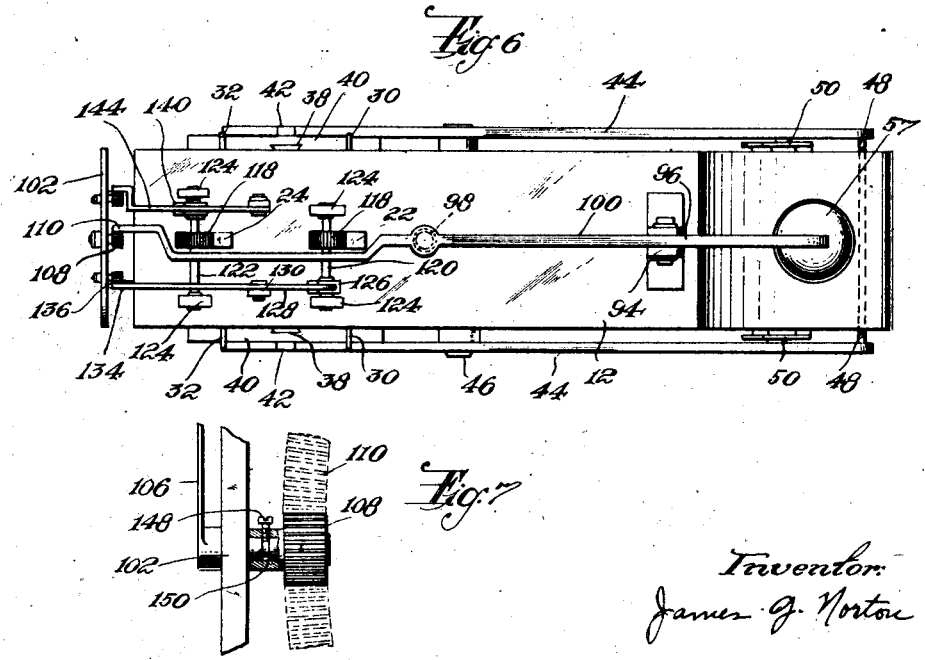
Inventor:
James G. Norton Patented May 29, 1928.

1,671,737

UNITED STATES PATENT OFFICE.

JAMES G. NORTON, OF NEW YORK, N. Y.

MEASURING APPARATUS.

Application filed February 21, 1922. Serial No. 538,256.

This invention relates to measuring apparatus and more particularly to apparatus for determining the dimensional characteristics of articles.

In order to determine whether an article is uniform with respect to one of its dimensions and the difference or variation, if any, in a dimension of an article such, for example, as its thickness, it has heretofore been necessary, so far as applicant is aware, to measure the article at one point, then to measure it at a point spaced from the first, and finally to compare the measurements and to calculate from them the difference in the dimension of the article at such points. The determination of the difference in thickness of an article in this way requires at least three and very often involves an even greater number of operations. For instance, if the person doing the measuring is not a good mathematician or does not have a retentive memory, he must proceed about as follows; first, measure the thickness of the article at one point; second, note down the measurement on a sheet of paper; third, measure the thickness of the article at a point spaced from the first; fourth, note down the measurement at the second point; and fifth, compare the two measurements and subtract the smaller from the larger. In the event that it is desired to measure an article very accurately, such as to thousandths of an inch, it may be necessary in the use of prior methods for a person who wishes to determine the difference in the thickness or other dimension of the article to perform all of the operations above enumerated, although he possesses both good mathematical ability and a good memory.

An object of this invention is to enable the uniformity or lack of uniformity of an article in one of its dimensions to be ascertained and the difference, if any, in the dimension at spaced points to be determined in a single operation and without necessitating the making of any calculation. In the use of the invention, uniformity in a dimension of an article at the points measured is, preferably, indicated by the registration of a pointer with the zero point on a scale, and the difference in the dimension may be read off directly on the scale from the extent to which the pointer is removed from the zero point.

An important feature of the invention resides in the provision of supporting means constructed and arranged to have an article passed over it and means for determining the difference in the thickness of the article at spaced points. The illustrated embodiment of the invention is particularly designed for use in determining whether steel strips or plates are of uniform thickness and the variation, if any, in the thickness of such strips. Accordingly, the supporting means is so constructed as to enable the passage of steel strips through the apparatus. In the manufacture of steel strips and plates, it is found that if the portions of a strip adjacent to its edges are of the desired thickness, the thickness of the strip at its intermediate portions is generally satisfactory. In the illustrated machine, therefore, the means for determining the difference in thickness of the article tested comprises detectors arranged for riding engagement with a strip adjacent to its edges. For convenience in passing the strips through the apparatus and to minimize wear on the supporting members and the detectors, such parts are preferably made in the form of rollers.

It is contemplated that the invention may be used in mills for rolling steel strips or plates, and that a machine embodying the invention may be interposed between each two adjacent sets of rolls in the mill or between any desired sets of rolls. In such use of the invention, the steel strips may be supported by the rolls of the mill during their engagement by the detecting rollers of the measuring apparatus, and the supporting means of the measuring apparatus may, consequently, be omitted without departing from the principles of the invention.

It is a further object of the invention to indicate directly whether an article is larger or smaller, as the case may be, in one of its dimensions at one piont than at another. To this end, an important feature of the invention consists in providing an indicator comprising a scale and a pointer and means for effecting relative movement of the scale and pointer to cause the pointer to occupy a position to one side or the other of a certain point on the scale depending upon the relation between the findings of the detectors which engage the article. In the rolling of steel strips, the operatives are more concerned that the thickness of the strip shall not be less than the desired measurement than that it shall not exceed such measurement. Accordingly, in the present machine the pointer is caused to occupy a position at the right side of the zero point on the scale, when the right side of the strip is the thinner, and to occupy a position at the left side of the zero point, when the left side of the strip is the thinner.

This application and my application for Letters Patent, Serial No. 391,317, filed June 24, 1920, for Apparatus for Testing and Grading Articles contain common patentable subject matter. Claims for such subject matter are made in the earlier application. Said application became Patent No. 1,442,233, Jan. 16, 1923.
Although the invention will be herein described in its application to an apparatus for determining the thickness characteristics of steel strips, it is recognized that the invention may be used to determine the characteristics of dimensions other than thickness, for example, width, and that it may be utilized in connection with articles and objects of widely varying form and composition. It is intended, therefore, that the scope of the invention shall not be limited except as required by the prior art.

Still other objects and features of the invention will appear as the description proceeds and will be pointed out in the appended claims.

In the drawings:

Fig. 1 is a view in side elevation of a machine constructed in accordance with the invention;

Fig. 2 is a transverse, elevational view taken substantially along the line 2—2 of Fig. 1 and looking toward the rear of the machine;

Fig. 3 is a detail view of the devices for directly controlling the movement of the main pointer of the indicator;

Fig. 4 is an enlarged view of one of the slides for operating the pointer controlling devices;

Figure 1:
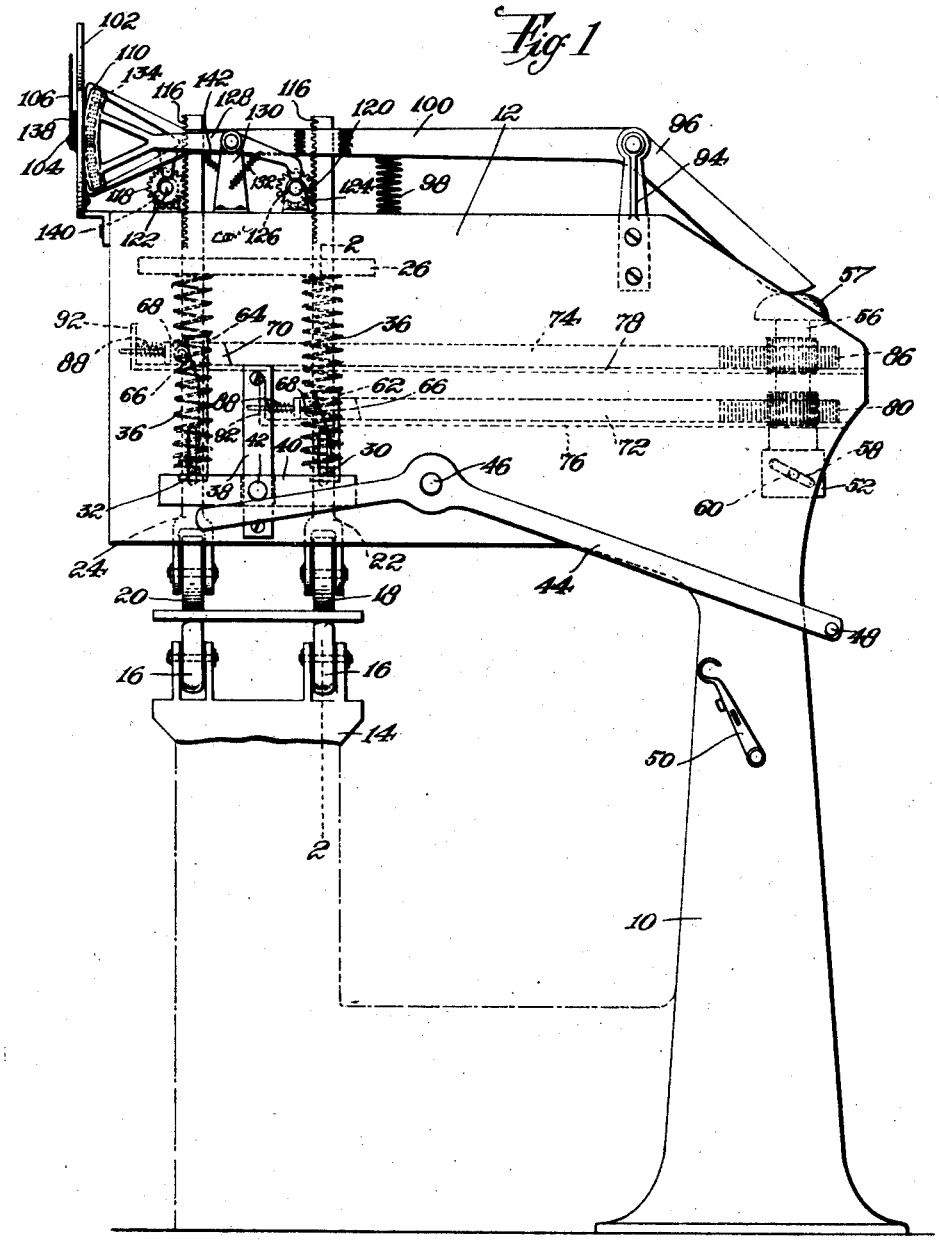

Fig. 5 illustrates the indicator looking toward the right in Fig. 1;

Fig. 6 is a plan view of the machine; and

Fig. 7 is a detail view of the connection between the main pointer of the indicator and its operating lever.

The illustrated machine comprises a column 10 adapted to be secured to a floor and carrying a head 12 on which the measuring apparatus is supported. The column 10 is also, preferably, provided with a bracket 14 upon which the supporting means for the article to be measured is mounted. As shown, the article supporting means comprises rollers 16 journalled in the bracket 14 against bodily movement relatively to the bracket and arranged to provide a gaging surface disposed in a substantially horizontal plane, and the rollers are spaced from each other by a distance such as to adapt them to engage a steel strip adjacent to its edges while the strip is being passed through the machine. Inasmuch as the rollers 16 are mounted on normally stationary axes in the supporting bracket, they present a fixed gaging surface contacting with the under side of a strip, despite their rotation during the passage of the strip through the machine.

The measuring apparatus comprises detectors constructed and arranged for riding engagement with a steel strip on the side opposite from the supporting rollers 16. Preferably, and as shown, in a machine for measuring steel strips, the detectors are constituted by rollers 18 and 20 adapted for engagement with the edge portions of the strip in the same vertical planes as the supporting rollers. The construction of the supporting members and the detectors in the form of rollers enables such parts to be used for a considerable period without appreciable wear and facilitates the passage of strips through the machine.

The detecting rollers 18 and 20 are journalled in the bifurcated lower ends of plungers 22 and 24 mounted in the head 12 of the machine for vertical sliding movement. As shown, the frame of the head 12 is of inverted U-shape, and the plungers 22 and 24 pass through the top wall of the frame. Between its top wall and its lower edges, the head is provided with upper and lower horizontal walls 26 and 28 which reinforce the frame of the head and support the plungers and the detecting rollers rigidly against lateral movement while permitting them to move freely in a vertical direction. The plungers 22 and 24 are provided with transversely disposed pins 30 and 32 extending at their outer ends through vertical slots 34 in the sides of the frame. The pins 30 and 32 maintain the detecting rollers 18 and 20 in proper alinement with the strip being measured and also limit the downward movement of the plungers and the detecting rollers under the action of compression springs 36 coiled about the plungers 22 and 24 between the upper wall 26 and the pins 30 and 32. Secured on the outer sides of the head 12 are vertical guide bars 38 upon which are dove-tailed horizontal bars 40 extending in both directions from the vertical bars 38 and having their ends disposed beneath the projecting ends of the pins 30 and 32. The bars 40 are provided centrally with outwardly extending studs 42 overlying the ends of levers 44 fulcrumed at 46 on the head 12. At the rear side of the machine, the ends of the levers 44 are connected by a transverse rod 48. With this construction it is apparent that by depressing the outer ends of the levers 44, the plungers 22 and 24 and the detecting rollers 18 and 20 may be raised to inoperative position. If desired, the plungers and the detecting rollers may be maintained in such position by engaging the hook of a catch 50 over the rod 48.

Journalled in the head 12 at the rear of the machine for rotation or angular movement in a horizontal plane is a sleeve 52 (Figs. 1 and 3) having a hollow nut 54 threaded on its lower end. Contained within the sleeve 52 is a post 56 extending upwardly above the upper end of the sleeve and formed with a head 57. The nut 54 is provided with a slot 58 which is inclined to the direction of angular movement of the sleeve. The post 56 is mounted in the sleeve 52 for angular movement relatively to the sleeve and the frame, and seated in the lower end of the post is a pin 60 received in the slot 58 of the sleeve. In the illustrated construction, assuming that the pin 60 occupies an intermediate position in the slot 58, if the sleeve 52 is moved angularly toward the left or clockwise relatively to the post 56, the pin and slot connection 60, 58 will cause the post 56 to be lowered, whereas, if the post 56 is turned to the left relatively to the sleeve 52, the post will be moved upwardly.

Connections are provided for transmitting movement directly from the plungers 22 and 24 to the sleeve 52 and post 56 respectively. Such connections preferably comprise wedge bars 62 and 64 guided for vertical movement on the inner side of one of the vertical walls of the head 12. The wedge bars 62 and 64 are provided with slotted ears at their lower ends embracing the pins 30 and 32 on the plungers, the wedge portions of the bars being located at their upper ends and presenting inclined surfaces 66 for engagement with rolls 68 journalled in longitudinal channels 70 formed in horizontally supported slides 72 and 74. The slides 72 and 74 are mounted on shelves 76 and 78 extending inwardly from the vertical wall of the head. The slide 72 is formed at its rear end with rack teeth 80 meshing with a pinion 82 on the sleeve 52. The post 56 is provided above the sleeve 52 with a gear 84 meshing with rack teeth 86 on the rear end of the slide 74. The slide 74 and shelf 78 are located above the slide 72 and shelf 76. Consequently, the wedge bar 64 which connects the slide 74 to the pin 32 on the plunger 24 is of greater length than the wedge bar 62 connecting the slide 72 to the pin 30 on the plunger 22. Otherwise, the connections between the plungers 22 and 24 and the sleeve 52 and post 56 respectively are similar. The slides 72 and 74 are normally urged to the right, as shown in Fig. 1 of the drawings, by springs 88 coiled about the reduced forward ends of the slides between shoulders 90 on the slides and the up-turned ends 92 of the shelves 76 and 78. The springs 88 are relatively light as compared to the springs 36 on the plungers, so that they operate to maintain the rolls 68 on the slides 72 and 74 against the inclined surfaces 66 of the wedge bars 62 and 64 without interference with the action of the springs 36 in pressing the detecting rollers 18 and 20 against the strip being measured. The connections between the plungers 22 and 24 and the sleeve 52 and post 56 are so constructed and arranged that, when the detecting rollers engage a strip at points of equal thickness, or the pins 30 and 32 rest on the bottoms of the slots 34 or on the lifting bars 40, the pin 60 on the post 56 is caused to occupy a position mid-way of the slot 58 in the sleeve 52. Moreover, such connections and the pin and slot connection 60, 58 are so constructed as to cause the post 56 to be raised or lowered from its normal position to an extent in accordance with the difference in thickness of the strip at the points engaged by the detecting rollers.

Pivoted on the top wall of the head 12 in uprights 94 is a lever 96 having the rear end of its shorter arm resting on the head 57 of the post 56 and maintained lightly against the head by a spring 98 interposed between the longer arm 100 of the lever and the top wall of the head 12. Mounted on the forward end of the head 12 is a dial 102 in the center of which is journalled a pintle 104 carrying a pointer 106 movable over the face of the dial upon rotation of the pintle. Fixed to the pintle on the rear side of the dial is a pinion 108 meshing with a segmental rack 110 at the end of the long arm 100 of the lever 96. The above-described connections between the post 56 and the pointer 106 are so constructed and arranged that, when the pin 60 on the post is located midway of the slot in the sleeve 52 and the post is in its normal vertical position, the pointer will register with the top point of the scale on the dial. The scale on the dial can be more accurately described as two scales extending in opposite directions from such top point which constitutes a common zero mark for both scales. The connections between the post 56 and the pointer 106 are further so constructed as to cause the pointer to be moved to the right or left of the zero point on the dial to an extent in accordance with the extent to which the post 56 is lowered or raised from its normal position.

The manner of operation of the parts thus far described is as follows: Assuming that a steel strip has been laid at one end on the supporting rollers 16, the catch 50 will be disengaged from the rod 48 of the levers 44, thereby permitting the springs 36 to force the detecting rollers downwardly against the upper side of the strip. If the strip is of equal thickness at its edge portions where it is engaged by the detecting rollers, the sleeve 52 will be moved angularly by the wedge bar 62 and slide 72 to the same extent that the post 56 is moved by the wedge bar 64 and slide 74, inasmuch as the angular or turning movements of the sleeve and the post are equal, there will be no relative angular movement between the sleeve and the post. Consequently, the pin 60 will remain mid-way of the slot 58 and the post 56 will remain in its normal vertical position, as will be indicated by the continued registration of the pointer 106 with the zero point on the dial. It will be understood from the foregoing that the position of the pointer is unaffected by the actual thickness of the strip, that is, whether the strip as a whole is a thick or thin one, since equal movements of the detecting rolls in the same direction will induce no movement of the pointer.

If the strip is thinner at the right-hand edge, where it is engaged by the detecting roller 18 than at its left-hand edge, the detecting roller 18 will be moved down further than the roller 20, and the sleeve 52 will be turned further to the left, as seen in Fig. 1 than will the post 56. Consequently, the post 56 will be lowered and, inasmuch as the segmental rack 110 is located on the far side of the pinion 108, as seen in Fig. 1 and the lever 96 is caused by the spring 98 to follow the movements of the post 56, the pointer 106 will be moved over the scale at the right of the zero mark on the dial 102 to an extent such as to indicate on the scale the difference in the thickness of the strip at the points measured.

If the strip is thinner at its left-hand edge, where it is engaged by the detecting roller 20 than at its right-hand edge, the post 56 will be turned further than the sleeve 52 and will, consequently, be forced upwardly by engagement of the pin 60 with the lower edge of the slot 58. This will cause the pointer 106 to be moved over the scale at the left of the zero mark on the dial 102 in accordance with the variation in the thickness of the strip.

The illustrated machine includes few connections where lost motion may develop and cause inaccuracy in the readings of the indicator. The provision of means for obviating lost motion in the various connections can be readily effected by a mechanic skilled in the art and would involve no departure from the principles of the invention. For example, the parts on the wedge bars 62 and 64 which embrace the pins 30 and 32 may be detachably and adjustably secured to the bars, so as to enable them to be moved on the bars to take up lost motion or to be replaced by new parts after they have become worn. Lost motion in the connections to rotary parts, such as the sleeve 52, post 56, and the pinion 108 on the pintle of the pointer 106 can be taken up by means such as are shown, for example, in the United States Letters Patent to Picard, 802,470, granted Oct. 24, 1905. It is further contemplated that, if found more convenient, the levers 44 for lifting the detecting rollers may have their operating ends extended forwardly on the head 12 rather than rearwardly, so that they may be actuated by an operative standing in front of the machine facing the dial 102.

Although the machine has been described as comprising only two detectors, it is recognized that many of the features of my present invention may be embodied in a machine comprising more than two detectors, and in which the detectors are caused to control the sleeve 52 and post 56 by connections such as are disclosed in my above-mentioned application for Letters Patent.

It is sometimes of importance to ascertain the actual thickness of an article, such as a steel strip or plate, at a certain point or points, as well as to determine the difference in the thickness of the article at such points. To this end, the plungers 22 and 24 are extended at their upper ends above the top wall of the head 12 and are provided with rack teeth 116 meshing with pinions 118 on shafts 120 and 122 mounted transversely of the head 12 in uprights 124. The shaft 120 is extended to the right of the pinion 118, as seen in Fig. 6 and is provided at its right end with a cam 126. A lever 128 fulcrumed in a bracket 130 on the top wall of the head 12 has its shorter arm held in engagement with the cam 126 by a suitable spring 132 and its longer arm formed at its forward end with teeth 134 meshing with a pinion 136 on the pintle of a small pointer 138 arranged to move over a small scale located within the peripheral scale of the dial 102 and at the right side of the center of the dial. As seen in Fig. 1, the lever 128 is positioned toward the observer from the pinion 136, so that as the plunger 22 is moved upwardly from the position in which the pin 30 rests on the bottoms of the slots 34 and in which the detecting rollers are in substantial contact with the supporting rollers 16, the pointer 138 is moved in a clockwise direction from the zero point on its scale.

The shaft 122 extends to the left of the plunger 24 as shown in Fig. 6, and is provided at its left-hand end with a cam 140 which, in co-operation with a spring 142 controls a lever 144, geared to the pointer 146 of a small scale located within the peripheral scale on the dial 102 at the left side of the dial. The gearing between the lever 144 and the pointer 146 is so arranged as to cause the pointer 146 to move in a clock-wise direction from zero position as the plunger is raised from its lowermost position.

From the foregoing, it will be understood that the accuracy of the indicators comprising the pointers 138 and 146 and that of the reading from the position of the pointer 106 on the dial can be verified by comparison of the difference in thickness of a strip as indicated directly by the pointer 106 with the result obtained by subtracting the smaller measurement, as indicated on the individual thickness indicators, from the larger measurement.

Although the invention has been described in its application to the measurement of articles, such as steel strips, which are desired to be of equal thickness at the points measured, it may, nevertheless, be utilized to measure articles which vary in the dimension being measured. For example, if a steel strip is intended to vary in thickness at its edges by half an inch, the invention may be employed to indicate directly whether the difference in the thickness of the strip is greater or less than half an inch. To facilitate the use of the invention for such purposes, the pinion 108 Fig. 7 on the pintle 104 of the pointer 106 is provided in its hub with a set screw 148 fitting into an annular groove 150 near the end of the pintle, so that after loosening the screw 148 the pointer 106 and its pintle may be turned relatively to the pinion 108. The pinion may then be secured in its adjusted position on the pintle by again tightening the set screw. With this construction, if it is desired to measure a steel strip which should vary in thickness at its edges by half an inch, the pointer 106 and the pinion 108 may be relatively adjusted so that, when a strip having a half inch variation is passed through the machine, the pointer 106 will occupy the zero position on the dial 102, and will move to the right or left of the zero point to indicate a less or greater variation than that desired and the extent of the departure from the desired variation. In such use of the machine, all of the strips are passed through the machine in the same relation, that is, the strips are arranged with their thinner edges always in engagement with the same one of the detecting rollers 18 and 20. In the foregoing sentence, it is assumed that the thinner edges of the strips are passed beneath the roller 18.

If the machine is set for use on strips of equal thickness and it is desired to adjust it for use on strips varying in thickness, for example, by half an inch, a convenient method of making the adjustment is to place a strip of the desired measurements beneath the detecting rollers and then to turn the pointer 106 relatively to the pinion 108 to set the pointer in zero position. Of course, instead of a strip other objects such as blocks having the desired difference in thickness may be placed under the detecting rollers to facilitate the setting of the pointer. It will be manifest, also, that the relative adjustment of the pointer 106 and the pinion 108 may also be utilized to make corrections in the indicator consisting of the dial 102 and the pointer. In other words, if it is found that the pointer 106, by reason of the development of a small amount of lost motion in the operation of some of the parts of the machine, does not register accurately with the zero point on the dial, when a strip of equal thickness or having the desired variation in thickness, is passed through the machine, the reading of the pointer can be corrected by turning it slightly with relation to the pinion. The pintles of the pointers 138 and 146 of the individual thickness indicators may also be connected to their operating pinions in the manner shown in Fig. 7, in order to enable the readings of the indicators to be corrected to compensate for slight wear of the operating parts.

The invention is also applicable to the measurement of strips of irregular form in transverse section, such as steel rails. In the measurement of rails, one of the detecting rollers may be caused to engage the edge of the upper flange of the rail and the other to engage the edge of the base flange. One or both of the detecting rollers may be grooved or otherwise suitably shaped to adapt them to the form of the article to be measured.

In rolling steel strips or plates, it is necessary to set the rolls very carefully, and after the rolls have been adjusted it is necessary to measure the strips frequently in order to make sure that a roll has not worn unequally or been accidentally moved from its proper position. This invention enables an operative to ascertain at a glance whether a strip is of the desired uniformity of thickness or whether it has the desired variation in thickness, as the case may be. If the strips delivered from a set of rolls are not of the desired relative thickness at their edges, correction may be made by adjusting one end of the rolls to the extent indicated by the pointer 106.

It will be apparent from the foregoing that a valuable feature of the invention resides in indicating or determining the relation between the findings of detectors, for example, thickness detectors, without requiring the performance of any mathematical calculation. In certain of the claims this feature is brought out in positive terminology by the recitation of means for directly indicating or determining, as the case may be, the relation between the findings of the detectors.

Having fully described the invention, what I claim as new and desire to secure by Letters Patent of the United States is:

1. In an apparatus of the class described, means for directly determining the difference in the thickness of an article at spaced points and means for supporting the article for traverse relatively to the supporting means and in engagement with the determining means, said determining means including detectors, an indicator, means for connecting the indicator with a plurality of the detectors, and means for causing each of the detectors to engage the article regardless of the thickness of the article at the point engaged by any other detector.

2. In an apparatus of the class described, supporting means constructed and arranged to support a strip of material for traverse over said means and mechanism for directly determining the variation, if any, in the thickness of the strip at points spaced from each other transversely of the strip, said mechanism comprising an indicator and means for causing the indicator to show whether the strip at a particular one of said points is thicker or thinner than at another of said points.

3. In an apparatus of the class described, a frame, supporting means fixed to the frame against relative bodily movement, and mechanism co-acting with the supporting means for directly determining the variation in thickness of an article, said mechanism comprising an indicator, detectors, an element mounted for compound movement including rotary and rectilinear components, connections between the detectors and the element for imparting said compound movement to said element and means for operatively connecting said element to the indicator.

4. In an apparatus of the class described, detecting devices constructed and arranged for riding engagement with a strip of material adjacent to its edges, means controlled by the detecting devices for directly indicating the difference in thickness of the strip at the points engaged by said devices, said means comprising an indicator and means for operatively connecting the indicator with a plurality of detecting devices, and means for causing each of the detecting devices to engage the strip regardless of the thickness of the strip at the point engaged by any other detecting device.

5. In an apparatus of the class described, supporting means arranged for engagement with one side of a strip of material and providing a fixed gaging surface, detecting rolls arranged for riding engagement with the opposite side of the strip adjacent to its edges, and means jointly controlled by the detecting rolls for indicating the variation in thickness of the strip at the points engaged by the detecting rolls, said means comprising an indicator, and means for causing the indicator to be at all times under joint control of a plurality of the detecting rolls during operation of the apparatus.

6. In an apparatus of the class described, a frame, a pair of detectors mounted on the frame for movement relatively thereto into operative engagement with a piece to be measured and mechanism controlled by the detectors for directly indicating the difference in thickness of the piece at points engaged by the detectors, said mechanism comprising an indicator and means for causing the indicator to show at which of said points the piece is relatively thick and thin respectively.

7. In an apparatus of the class described, a frame, a pair of detectors each of which is mounted on the frame for movement relatively thereto, means for automatically moving the detectors into operative relation with a piece to be measured, an indicator and mechanism for jointly controlling the indicator by the detectors to cause it to indicate the difference in thickness of the piece at the points engaged by the detectors, said mechanism including an element always operatively connected with one of the detectors, another element always operatively connected with the other detector and means for causing the indicator to be at all times under the joint control of said elements during operation of the apparatus.

8. In an apparatus of the class described, a frame, a pair of members mounted on the frame for engagement with a strip of material at points spaced from each other transversely of the strip, and mechanism controlled by said members for directly determining the difference in thickness of the strip at the points engaged by the members, said mechanism including an indicator and operating connections between the indicator and said members respectively, each of said connections always comprising the same parts and said connections being constructed to cause the indicator to be always operatively connected with both of said members during operation of the apparatus 9. In an apparatus of the class described, a frame, a pair of detectors mounted on the frame for engagement with a piece to be measured and mechanism controlled by the detectors for directly determining the difference in thickness of the piece at spaced points, said mechanism comprising an indicator, an indicator-controlling and detector-controlled element, and operating connections always comprising the same parts between said element and the indicator and between the element and each of the detectors respectively, said operating connections being constructed to cause said element to be always operatively connected with both of said detectors during operation of the apparatus.

10. In an apparatus of the class described, a frame, detecting devices movably mounted on the frame and constructed to ride on a steel strip adjacent to its edges, yielding means tending to move the detecting devices toward the strip, and means controlled by the detecting devices for directly indicating the difference in the thickness of the strip at the points engaged by said devices.

11. In an apparatus of the class described, a pair of detecting devices, a movable member, connections between said member and one of said devices for moving the member in harmony with said device, said connections being operative to move the member in either one of two opposite directions, means connected with the other detecting device for imparting to said member movements in a line of motion at an angle to the first-mentioned directions and to an extent corresponding with the difference in movements of the detecting devices, and means for indicating the position of said member in said line of motion.

12. In an apparatus of the class described, a frame, a member mounted on the frame for movement relatively thereto, a second member mounted on the frame for movement relatively to the frame and the first-mentioned member, a pair of detecting devices, means for transmitting movement from one of the detecting devices to one of said members and means for transmitting movement from the other detecting device to the other of said members, an indicator, connections between said members for imparting movement to said first-mentioned member upon relative movement of the members in a direction at an angle to that in which said transmitting means tends to move it, and means for utilizing the movement of the first-mentioned member caused by said connections to set the indicator.

13. In an apparatus of the class described, a frame, a sleeve mounted in the frame for rotary movement relatively thereto, a member mounted in the sleeve for rotary movement relatively to the frame and to said sleeve, connections between the sleeve and said member for effecting relative movement of said member and the sleeve axially of the sleeve upon relative rotary movement of the member and the sleeve, a pair of detectors, means for transmitting rotary movement from one of the detectors to the sleeve, means for transmitting rotary movement from the other detector to said member, an indicator, and means for setting the indicator in accordance with the extent of relative axial movement of the sleeve and said member.

14. In an apparatus of the class described, a frame, a sleeve mounted on the frame for rotary movement relatively thereto, a post mounted in the sleeve for rotary movement relatively to the frame and the sleeve, detectors arranged for engagement with a strip of material adjacent to its edges, connections between one of the detectors and the sleeve for imparting rotary movement to the sleeve, connections between the other detector and the post for imparting rotary movement to the post, means for moving the post vertically upon relative rotary movement of the sleeve and the post, an indicator, and means for setting the indicator in accordance with the position of the post in the range of its vertical movement.

15. In an apparatus of the class described, a frame, a sleeve mounted on the frame for rotary movement relatively thereto, a post mounted in the sleeve for rotary movement relatively to the sleeve and the frame, detecting rolls constructed and arranged for riding engagement with a steel strip adjacent to its edges, connections between one of the detecting rolls and the sleeve for causing the sleeve to be rotated at all times in response to movement of said roll, connections between the other detecting roll and the post for causing the post to be rotated at all times in response to the movement of said last-mentioned roll, a pin and slot connection between the sleeve and the post constructed to cause the post to be moved vertically in response to relative rotary movement of the sleeve and the post, an indicator, and means for setting the indicator in accordance with the position of the post in the range of its vertical movement.

16. In an apparatus of the class described, an indicator comprising a scale and a pointer, a pair of independently movable detectors, means for maintaining an object to be measured in position for engagement by the detectors, and means for effecting relative movement of the scale and the pointer to cause the pointer upon relative movement of the detectors to occupy a position at one side or the other of a certain point on said scale depending upon whether the finding of one of the detectors is greater or less than the finding of the other detector.

17. In an apparatus of the class described, a frame, an indicator on the frame comprising a scale and a pointer, a pair of detectors mounted on the frame for movement relatively thereto, mechanism constructed to provide a gaging surface for engagement with an article opposite from each of the detectors, and means controlled by the detectors for effecting relative movement of the scale and the pointer to cause the pointer to occupy a position at one side or the other of a certain point on the scale depending upon whether the finding of one of the detectors is greater or less than the finding of the other detector.

18. In an apparatus of the class described, an indicator comprising a scale and a pointer, a pair of detectors arranged for engagement with an article to determine its thickness, and means controlled by the detectors for effecting relative movement of the scale and the pointer to cause the pointer to occupy a position at one side or the other of a certain point on the scale depending upon whether the article at the point engaged by one of said detectors is thicker or thinner than at the point engaged by the other detector.

19. In an apparatus of the class described, an indicator comprising a scale and a pointer, a pair of detectors arranged for engagement with an article to determine its thickness, and means controlled by the detectors for effecting relative movement of the scale and the pointer to cause the pointer to occupy a position at one side or the other of a certain point on the scale, depending upon whether the article at the point engaged by one of said detectors is thicker or thinner than at the point engaged by the other detector, and to an extent in accordance with the difference in the thickness of the article at said points.

20. In an apparatus of the class described, a dial having like scales extending on opposite sides of a common zero point, a pointer, a pair of detecting rolls arranged for riding engagement with a steel strip adjacent to its edges, and means controlled by the detecting rolls for moving the pointer to the right or left of the zero point on the scale depending upon which of the edges of the strip is the thicker and to an extent in accordance with the difference in thickness of the strip at its edges.

21. In an apparatus of the class described, a frame, an indicator comprising a pointer and a dial having two scales extending in opposite directions from a common zero point, a post and a sleeve enclosing the post and having a slot inclined to its axis, said sleeve being mounted on the frame for angular movement relatively to the frame and post, a pin carried by the post and fitted into the slot in the sleeve for moving the post vertically upon relative angular movement of the post and the sleeve, connections between the post and the pointer for causing the pointer to register with the zero point on the scale when the pin occupies a predetermined intermediate position in the slot and operable to move the pointer to one or the other side of the zero point to an extent in accordance with the raising or lowering of the post from the position in which the pin occupies said predetermined position in the slot, a pair of detectors for engaging an article at spaced points to determine its relative thickness, and connections between one of said detectors and the post and between the other detector and the sleeve constructed to move the sleeve and the post angularly upon movement of the corresponding detectors, said connections being further constructed to cause the pin to occupy said predetermined intermediate position in the slot when the article is of equal thickness at the points engaged by the detectors, and said last-named connections and the pin and slot connection being constructed to cause the post to be moved upwardly or downwardly in accordance as to whether the article at the point engaged by one of the detectors is thicker or thinner than at the point engaged by the other detector, and to an extent in accordance with the difference in thickness of the article at the points engaged by the detectors.

22. In an apparatus of the class described, a frame, a member movably mounted on the frame and provided with a surface inclined to its direction of movement, a second member mounted on the frame for movement relatively to the frame and the first-mentioned member and provided with a part arranged for engagement with said inclined surface to cause movement of said first member to effect movement of the second member in a line of motion at an angle to the direction of relative movement of the members, a pair of detectors for determining the thickness of an article at spaced points, connections between the detectors and said members constructed to cause said part to occupy an intermediate position on said inclined surface when the detectors engage an article at points of equal thickness, said connections being further constructed to cause the second member to be moved in said line of motion in accordance with the difference in thickness of an article at the points engaged by the detectors and in either of two directions depending upon whether the article is relatively thick or thin at the point engaged by one of the detectors, an indicator comprising a pointer and a scale, and connections between the indicator and said second member for causing the pointer to register with a certain point on the scale when said part is in said intermediate position on the inclined surface of the first member and constructed to effect relative movement of the scale and pointer in a direction and to an extent in accordance with the character of the movement imparted to said second member in said line of motion.

23. In an apparatus of the class described, a plurality of detectors for determining dimensions of an article at spaced points, means for supporting the article for traverse relatively to the supporting means and in engagement with the detectors, means controlled by the detectors for indicating the individual findings of the detectors, and means controlled by the detectors for directly indicating the relation between the findings of the detectors, so that the accuracy of the relation between the findings of the detectors as obtained by calculation from the readings of the first-mentioned indicating means and as obtained directly from the readings of the last-mentioned indicating means may be verified by comparison of the reading of the last-mentioned indicating means with the result of the calculation, said last-mentioned means comprising indicating devices separate from those of the first-mentioned indicating means.

24. In an apparatus of the class described, a dial having a scale of graduations arranged around its periphery and being provided with a pair of relatively small circular scales located within the first-mentioned scale, a pair of detectors for determining the thickness of an article, means controlled by one of the detectors for indicating the thickness of the article at the point engaged by it on one of said smaller scales, means controlled by the other detector for indicating the thickness of the article at the point engaged by it on the other of said smaller scales, and means controlled by both of the detectors for directly indicating on the peripheral scale the difference in thickness of the article at the points engaged by the detectors.

25. In an apparatus of the class described, supporting means constructed and arranged to support a strip of material for traverse over said means and mechanism for directly indicating the difference in the thickness of the strip at two points adjacent to its edges regardless of whether the strip is thicker or thinner at one of said points than at the other, said mechanism comprising an indicator, a pair of detecting devices, a control element for the indicator, means for causing said element to operate the indicator, and means comprising an operating connection always comprising the same parts between the control element and each of the detecting devices for imparting compound movement including rotary and rectilinear components to said element under the control of the detecting devices.

26. In an apparatus of the class described, detecting devices constructed and arranged for riding engagement with a strip of material in lines spaced from each other transversely of the strip, means for supporting the strip for traverse relatively to the detecting devices and in engagement therewith, and means controlled by the detecting devices for directly determining the difference in thickness of the strip at spaced points regardless of whether the strip is thicker or thinner at a particular one of said points than at another of said points, said determining means comprising an indicator, a control element for the indicator, means for causing said element to operate the indicator, and operating connections between the detecting devices and the element for imparting to the element compound movement including rotary and rectilinear components, said connections including a connection between the element and one of the detecting devices comprising the same parts regardless of the relation between the findings of the detecting devices.

27. In an apparatus of the class described, detectors engaging a strip of material at points spaced transversely of the strip, means for supporting the strip for traverse relatively to the detectors and mechanism including an indicator and controlled by the detectors for directly indicating relative positions of the detectors, said indicator comprising a relatively movable scale and pointer and said mechanism including an element mounted for compound movement including rotary and rectilinear components under control of the detectors, an operating connection between the element and the indicator, and means including an operating connection always comprising the same parts between the element and each of the detectors for imparting said compound movement to the element.

28. In an apparatus of the class described, a frame, a pair of detectors mounted for movement relatively thereto and mechanism controlled by the detectors for directly determining the difference between the findings of the detectors regardless of which of the detectors gives the larger finding, said mechanism comprising an element mounted for compound movement including rotary and rectilinear components and mechanism for imparting such compound movement to said element, said mechanism including means for forming a connection between each of the detectors and the element, which always comprises the same parts regardless of the relation between the findings of the detectors.

29. Measuring apparatus comprising a frame including members provided with slots, means for supporting a strip for traverse over said means, a pair of detectors mounted on the frame for engagement with the strip adjacent to its edges, axially movable plungers carrying the detectors, a manually-controllable member, and connections between the last-mentioned member and the detectors for moving the detectors out of contact with the strip upon movement of the member, said connections comprising pins guided in said slots and connected to the plungers to restrain them against rotation and members mounted on the frame members and operatively connected with said pins.

30. Measuring apparatus comprising a frame including members provided with slots, means for supporting a strip for traverse over said means, a plurality of detectors mounted movably relatively to the strip for engagement with it, axially movable plungers carrying the detectors, a manually-controllable member and connections between the detectors and the last-mentioned member for moving the detectors out of contact with the strip upon movement of the member, said connections comprising pins connected to the plungers and guided in said slots, members having portions underlying said pins and means located between the slots for guiding said last-mentioned members.

31. Measuring apparatus comprising a frame, gaging devices, detecting devices, means for yieldingly urging the detecting devices toward the gaging devices, members mounted externally on the frame for movement toward and from the gaging devices, pin connections between the detecting devices and said members, and manually-controlled means operatively connected with said members for moving the detecting devices in opposition to the yielding means.

In testimony whereof I affix my signature.

JAMES G. NORTON.